Jan. 27, 1970  E. F. PETERSON ET AL  3,491,825
SEAL MEANS FOR COOPERATIVE CONTACTING SURFACES
IN CORE BOXES AND THE LIKE
Filed Jan. 18, 1968
2 Sheets-Sheet 1
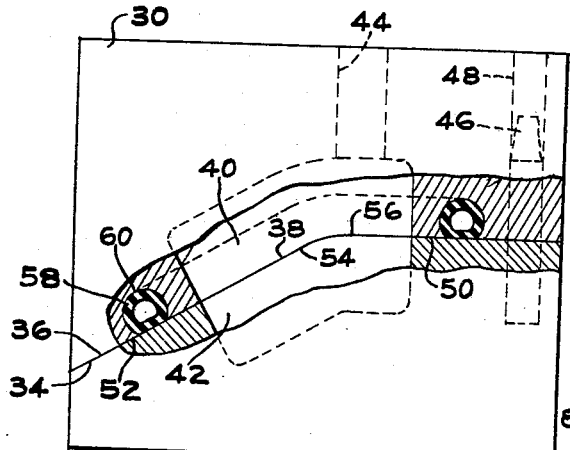
FIG. 1
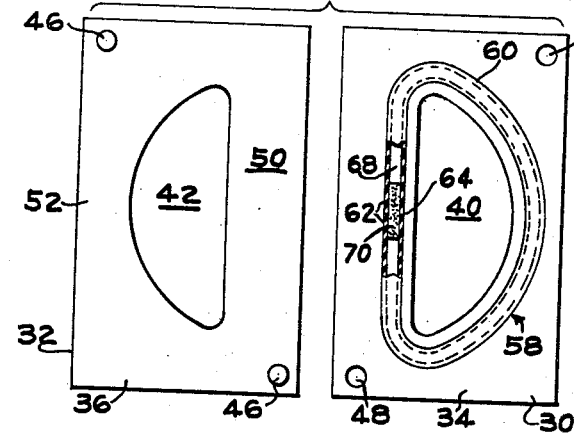
FIG. 2
FIG. 3
FIG. 4
FIG. 5
FIG. 6
FIG. 7
FIG. 8
FIG. 9
FIG. 10
FIG. 11
INVENTORS
E.F. PETERSON &
C.G. MATSON United States Patent Office 3,491,825
Patented Jan. 27, 1970

3,491,825
SEAL MEANS FOR COOPERATIVE CONTACTING
SURFACES IN CORE BOXES AND THE LIKE
Edwin F. Peterson, c/o Martin Engineering Co., Neponset, Ill. 61345, and Carl G. Matson, 401 E. Central Blvd., Kewanee, Ill. 61443
Filed Jan. 18, 1968, Ser. No. 698,823
Int. Cl. B22c 7/06
U.S. Cl. 164—228                                    2 Claims

ABSTRACT OF THE DISCLOSURE

A seal of generally circular section and having a soft center so as to be deformable by the seating of one member on another in which the seal is carried via a substantially semicircular channel or groove provided with interiorally overhanging lip means capable of mechanically retaining the seal despite repeated separation and re-assembly of the cooperating parts.

Background of the invention

One particular area in which the present invention is useful, and for which it has been especially designed, involves the sealing of the parting plane or surface of cooperative members of core boxes such as used in the blow molding of cores. Those familiar with the art are fully aware of the problems presented, due mainly to the escape of fluids and core sand, deterioration of seals, difficulty of installing and maintaining proper seals etc. because of discrepancies in the mating surfaces, high cavity pressures, lack of alinement, etc. One prior art attempted solution relies upon the provision in the mating surfaces of mating channels opposing each other and incorporating a seal strip that initially fits the channels loosely but which is subsequently activated and molded in situ so as to expand into and fill the channels. An example of this arrangement appears in the U.S. patent to Olson, No. 2,815,549. Since the provision of channels in both surfaces presents problems of machining, alinement etc., attempts have been made to exploit the use of a channel in only one of the parts and a seal strip in this channel which is capable of deformation upon contact with the flat surface of the other part. The U. S. patents to Peterson, Nos. 3,074,129 and 3,102,309 pursue this approach. A basic disadvantage here is that the seal strip must be affixed to its channel by a special adhesive (rubber to metal) and this militates against easy removal and replacement of the seal, although not to the extent required by the system of the above Olson patent. Replaceability is significant, because core boxes are handled frequently and rather roughly, are stored in stacks and the seals are subject to a variety of impact and setting forces. An early attempt had been made to affix a seal strip in a channel having a dovetail cross section, but this arrangement is limited to flat-single plane surfaces because of the extreme difficulties encountered in machining the dovetail-section channel. This is exemplified in the U.S. patent to Rehklau, No. 2,510,417.

Summary of the invention

One of the basic aims of the present invention is to avoid the disadvantages of the prior art structures and methods, and this is accomplished primarily by the provision of a structure in which only one of the cooperative parts need be formed with a channel, and this channel is so constructed as to obviate the need for special cements and adhesives because it is of substantially semi-circular shape but is provided additionally with inwardly overhanging opposed lip means adapted to mechanically retain the seal so that the seal not only stays in place prior to and during assembly and disassembly of the parts but is readily removable and replaceable. The seal strip itself is of substantially circular section and thus has a segment capable of reaching beyond the substantially semicircular configuration of the channel and is accordingly engageable with the flat opposing surface of the mating part so as to be deformable thereby. The soft center characteristic of the seal strip may result from a simple tubular section or from such section as supplemented by internal means for expanding or inflating the seal, and this means may be gaseous or a combination of gas and other material, leaving the seal characteristically deformable under compression when the cooperative parts are assembled and also capable of recovering to substantially its pre-deformed shape when the parts are separated.

Another feature of the inventive embodiments is that the lack of requirement for cements and other adhesives effects considerable economies in cost, labor, maintenance and storage, because the parts need not be specially treated to prevent their sticking together. The shape, in cross section, of the seal-receiving channel affords further economies in manufacture because the channel may be easily and simply machined, as by a spherical or partly-spherical cutter or miller, and consequently parting surfaces at divergent planes may be readily accommodated. The soft-center seal strips, being of complementary circular cross section, or substantially so, may be inexpensively formed as extrusions of known elastomers, and the soft-center characteristic thereof permits the use of known elastomers that have tough and long-lasting exterior walls capable of resisting abrasion, erosion and other physical and/or chemical action resulting from contact with the variety of materials used, for example, in blow molding.

The retention of the seal strip by mechanical means, absent adhesives etc., enables its use in a variety of forms, either continuously bordering cavities such as found in core boxes or as double-ended configurations plugged at opposite ends. This feature—retention of the strip—adds to the flexibility thereof so far as concerns the internal pressures that can be applied thereto, because the soft-center seal can tolerate pressures in the range of 2 to 15 p.s.i. and, thus pressurized, resist compression set or permanent deformation, and the seal pressure can be readily matched to the core box pressure. Other features will become apparent as the invention is fully disclosed in the following description and drawings.

Description of the drawings

FIG. 1 shows a representative assembly, partly in section, employing one form of seal means;

FIG. 2 is a plan, on a reduced scale, of the two cooperative parts lying side by side;

FIG. 3 is a similar view, employing a different seal arrangement;

FIG. 4 is an enlarged section of one form of seal per se;

FIG. 5 is a section, drawn to the scale of FIG. 4 and showing a seal-receiving channel;

FIG. 6 is a section similar to FIG. 5 but illustrating the installed seal without cross-hatching;

FIG. 7 is a section showing an assembly of the cooperative parts partially closed or seated;

FIG. 8 is a similar section illustrating the parts in contact and the seal fully deformed;

FIG. 9 is a section on the same scale as FIGS. 4–8 and showing a typical cutter as used in forming the seal-receiving channel;

FIG. 10 is a cross section through the seal and its contained plug or joint member;

FIG. 11 is a fragmentary longitudinal section showing one form of means for expanding the seal;

Description of preferred embodiments

Figure 12:
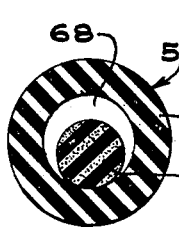
FIG. 12 is a cross-section of a modified form of seal like that of FIG. 4 but including an expandible core means in unexpanded form.

Reference will be had first to FIG. 1 for orientation purposes. What is shown here is a representative assembly of a core box or like pressure molding apparatus including complementary upper and lower members 30 and 32 respectively having confronting surfaces 34 and 36 meeting at a parting plane 38. The members further have complementary cavities 40 and 42 into which the core or equivalent material is introduced via an inlet 44, all of which is generally conventional. The two members are alined during and after assembly by a plurality of guide pins or dowels, one of which is shown at 46 as being received by a bore 48 in the opposed member. The terms "parting plane" or "parting line" are words of art and are so used here even though all portions of the confronting surfaces 34 and 36 are not always in exactly the same flat plane, one example being that illustrated in FIG. 1 where the left-hand portion of the parting "plane" is downhill with respect to the right-hand portion. The areas of these surfaces where sealing is effected are, however, flat as to each other, as at 50 and 52 as well as at 54, and any curves in the confronting faces will be coincident as at 56. In any event, the faces or surfaces are mating surfaces and in a theoretically ideal situation the expected interface would be perfect and no loss of pressure or blown-in material would occur. Actually, however, this ideal is never attained and some form of seal must be provided in surrounding relation to the cavity 40–42. As explained before, such seals are, in general and as to a variety of specific types, well known and that shown here and designated generally by the numeral 58 may be regarded as typical as to location and relationship to the cavity 40–42, but, as will be explained below, the seal has many novel characteristics and the foregoing observation is made merely by way of background.

FIG. 2, drawn to a reduced scale as respects FIG. 1, illustrates the cavity-surrounding disposition of the seal 58, it being clear that the members 30 and 32 are in pre-assembled relationship so that their respective confronting surfaces 34 and 36 are facing upwardly. It is important to note that the seal 58 is carried by only one of the members, here the member 30; although, it is not material which member carries the seal. Hence, only the member 30 need be provided with means for mounting the seal, and the face 36 of the other member may remain flat and ungrooved in its seal-contacting area. The means for mounting the seal 58 in the member 30 is here an endless or closed-loop channel 60, and the seal is an elongated strip having opposite terminal ends 62 brought together and abutted to form a joint or junction 64. As will be developed more fully below, a distinct advantage of the present structure is that the strip need not be specially molded either in the channel 60 or to match the channel and thus can be a simple inexpensive extrusion of any of the well known deformable or compressible elastomers which may be cut to length and laid in the channel. In the present embodiment, the seal 58 is a tubular strip of circular cross section having an annual wall 66 of appreciable thickness as distinguished from a mere film as in some instances of the prior art. Since the seal is tubular it has a hollow center which enables the annular wall to deform or deflect, as when the two members 30 and 32 are brought together and held by a conventional clamping means (not shown) against separation. The hollow interior of the tubular seal 58 gives it what may be called a "soft center," a term used here to embrace other interiors, as where the strip is formed of two or more materials or as where the hollow is filled or partially filled with expansive-compressive material, examples of which will be described later. The significant aspect is that the seal is not totally solid rubber, for example, because then it would be incompressible. Because of the soft-center characteristic of the seal 58, it may have the appreciably thick annular wall 66 and thus may combine the characteristics of toughness, smooth exterior and capability of being extruded by any of the well-known methods from any of the equally well-known elastomers found useful in the coremaking and like arts. Such materials are so familiar as to require no elaboration here and reference may be had to the patents referred to above for examples; although, this does not exclude the use of other and later developed materials. In other words, no claim is made here as to the discovery of new substances, but novelty is asserted as to new uses and applications of known and later-equivalent materials and substances in the present area of seal structures. With the foregoing in mind, the "soft center" of the seal 58 as shown in FIGS. 1–11, although comprising the hollow center or chamber of the seal, is designated by the numeral 68.

As best shown in FIGS. 2 and 11, the junction 64 of the terminal ends 62 of the tubular seal may be effected by the insertion of a plug 70 into these ends so as to bridge the junction, the ends being suitably faced off to effect a leak proof joint. The plug may be of a compressible elastomer of any well-known type so as to retain the compressibility characteristic of the seal and, if necessary may be cemented to the interior portions of the ends 62 or may simply have a tight leak-proof fit. The plug is preferably formed of a sponge elastomer of cellular structure embodying enclosed cells capable of trapping air or other gaseous elements. Here again, such materials are well known and need not be elaborated beyond the references already made above.

In the instance described, where the channel 60 is continuous so as to surround the cavity 40–42, the seal also becomes continuous as joined by the plug 70 and the interior 68 becomes a closed chamber which may contain, or into which may be introduced, means effecting radially outwardly expansive forces on the annular wall 66, the plug 70 effectively sealing the junction as described above or the plug material being such that it bonds by vulcanizing to the interior of the annular wall 66. To further augment not only the sealing functions of the seal 58 but also its retention in the channel 60, the expansive means may be simply air introduced by an inflating device 72 having a hollow needle 74. If desired, the device may be charged with any other well-known gaseous element or combinations thereof which may be introduced into the tube interior. Another method could involve the use of a pill or the like of compressed bicarbonate of soda inserted into the tube before the final joint is effected and activated by a charge of acetic acid or the like by manipulating the seal after completion of the joint so as to bring the pill and acid together. Experience has demonstrated that the tubular seal will tolerate internal pressures up to one atmosphere, and thus these pressures can vary up to this limit and be adapted to accommodate the pressures that build up in the cavity 40-42 during molding. It is intended that the internal pressure, once established, be maintained. If it drops because of leakage, for example, it may be easily supplemented by the device already described at 72. It is a characteristic of the elastomer used here that it is virtually self-sealing so that leakage after withdrawal of the inflating or charging needle 74 is minimal.

FIG. 3 illustrates a modified seal-to-cavity relationship in an assembly including a pair of members 30' and 32' respectively having complementary cavities 40' and 42' capable of assembly according to FIG. 1 when the member 30' is inverted and placed on top of the member 32'. In this case, however, the seal is made up of intersecting elements, 58a in channels 60a in the member 30' and 58b in channels 60b in the member 32'. Although it is true that both members 30', 32' have channels, these channels are not opposed and hence need not match each other. Each seal may be of tubular construction according to what has already been described but, since each seal element has opposite terminal ends not abutting at a joint such as that at 64 (FIG. 11), each such end is plugged by a plug 70a for the seals 58a and 70b for the seals 58b. Each plug may be identical, as to composition, to that shown and described at 70 and the interior soft center or chamber of each seal may be charged according to any of the methods described above or to be described below or equivalents thereof. When the two members 30' and 32' are superimposed upon each other, the seal intersections deform to enable the accomplished of a complete surrounding seal about the cavity 40'-42'.

Figure 13:
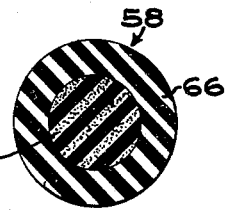
FIG. 13 is a similar section showing the core expanded.
Figure 14:
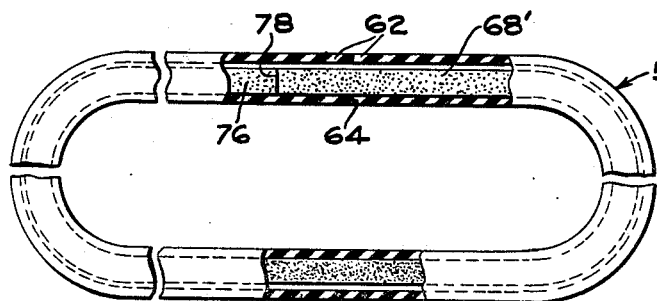
FIG. 14 is a plan, on a reduced scale and with portions borken away, illustrating the relationship of the core to the length of the seal.

FIG. 14 illustrates a continuous seal in which the ends 62 of the seal 58 are brought together to effect a junction 64, but the internal means for effecting radially outwardly expansive forces on the annular wall are not only specifically different from those described before but this means also completes the junction between the seal strip ends. In this case, the internal means comprises a core element 68', preferably of a cellular elastomer expansible, for example by heating, say, to vulcanizing temperature. This core runs coextensively with the seal 58 and has its terminal ends 76 abutted at a junction 78 that is offset from the tube end junction 64 lengthwise of the seal, the accomplishment of which may be effected by cutting the core element at the same length as the seal 58 and inserting it loosely into the seal so that one end projects beyond one end of the seal so as to enter the opposite end of the seal. The initial diameter of the core element is less than that of the interior 68 of the seal 58, shown in somewhat exaggerated fashion in FIG. 12, but when subjected to vulcanizing heat, for example, the core element expands to fill the seal chamber 68 as shown in FIG. 13. The core, being cellular, retains its compressibility characteristic and serves the dual function of completing the joint between the seal strip ends and of applying internal pressures to the annular wall 66.

The same system may be employed in the seals 58a and 58b of FIG. 3, wherein the core element would run lengthwise of and coextensive with the respective seals and upon vulcanization would not only seal the strip ends but would, as in the case described, serve as the means for radially expanding the seal strips to the compressible condition already set forth.

A further feature of the invention is that the seal 58, or its equivalents, is mechanically retained in the channel 60 or its equivalent; that is to say, the seal need not be cemented or bonded or even molded in situ, as, for example, in the above Olson and Peterson patents. This feature affords many advantages, among which are: the seal strip may be a simple extrusion as already described, it may be easily installed, it may be removed and replaced if damaged, it may be easily activated after installation and charged to any desired internal pressure and, since it is retained by its carrying member, inadvertent displacement is virtually impossible. These advantages are important when it is considered that the members 30, 32 etc. are handled with a high degree of frequency, often by careless personnel, are stored by stacking for long periods and are otherwise subject to conditions in which seal life becomes intolerably short. In addition, it is a significant advantage that only one of the confronting members need be channelled or grooved to carry the seal and the other member need not be specially formed to contribute to the achievement of an adequate seal.

This feature or object is achieved by a special formation or shape of the channel 60, one embodiment of which is depicted in detail in FIGS. 5-9 and 15, wherein it is shown that the channel 60 opens outwardly to the member surface 34 as a slot 80 of uniform width B having parallel edges 82 spaced equidistantly from a median plane CD perpendicular to the surface 34. In this instance, the channel 60 is of greater than semi-cylindrical section, having a portion 84 of semi-cylindrical extent and terminal continuations 86 of the semi-circular arc that provide the edges or lips 82. The arc that includes the semi-circular part 84 and arcuate continuations 86 is part of a circle formed about an axis A that is spaced inwardly (here upwardly) from the surface 34 and lying on the median plane CD and thus equidistant from the edges 82 of the slot 80. Therefore, the slot width B is less than the diameter of the circle of which the arc 86-84-86 is a segment, which diameter is of course twice the radius R.

The seal 58 as shown in FIGS. 1-8 and 10-14 is of circular cross section on the diameter 2R and thus has a portion 88 filling and retained by the channel 60, because of the overhanging lips 82, and a further portion 90 projecting or reaching outwardly through the slot and beyond the surface 34 for engagement with the confronting surface of the other member 32 (FIG. 9, showing partial deformation of the seal and FIG. 10, showing complete deformation). Stated otherwise, the tubular seal 58 has an outside diameter E equal to twice the radius R of the channel 60 so that the major segmental portion 88 of the seal fits and fills the channel 60 and the minor segmental portion 90 exceeds the depth of the channel by the height or distance F. Consequently, the channel 60 is a major segment of the circle on which both the channel and seal are formed on the coincident axis A, and this circle, in the case of the channel is cut by a chord GH included in the surface 34 and giving the slot 80 its width B, which is of course shorter than the diameter E (twice the radius R).

The above relationship establishes a mechanical retention of the seal 58 in the channel 60, since the width B of the seal at the surface 34 is less than the diameter 2R (or E). The seal 58, being compressible, is easily inserted into the channel and the amount by which the arcuate extent of the channel exceeds 180° is such that the seal cannot be inadvertently displaced or pulled out from the channel; although, the seal may be deliberately removed by manual force. Nevertheless, the retention is more than adequate to withstand loss of the seal strip during handling and storage. No cement or other adhesive is needed and yet the seal strip can be replaced for whatever reason makes replacement necessary.

The depth of the channel 60, as measured vertically from the surface 34, may be defined in many ways. For example, this depth, designated H, is of course less than the diameter E or 2R and may be measured or identified as E minus F, or it may be considered as a function of the angle X, which is 360° minus the arcuate extent of the arc 86-84-86 of the channel; or it may be regarded as a function of the width B of the slot 80. However considered, the arcuate extent of the channel exceeds a semi-circle or 180° and it is preferred that this depth H be on the order of 60–80% of the diameter of the circle formed about the axis A; or the angle X can be regarded as in the order of 170° or less; although, theoretically any angle less than 180° should be expected to retain the seal. Despite the considerations as to how these characteristics are defined, the important factor to be regarded is the amount of reach or projection the seal 58 has beyond the surface 34, here represented by the dimension F; that is, the projection of the seal for contact and deflection or deformation by the confronting surface 36 of the other member 36 (compare FIGS. 6–8). Thus, if the depth of the channel 60, regarded as a major segment of the circle formed on the diameter E, is on the order of 60–80% of the diameter E, then the height or measurement of the minor segment among the line or median plane CD (dimension F) will be on the order of 20–40% of the diameter E. These dimensions of course determine the distance B along the chord GH in the plane or surface 34, and thus determine the neck through which the seal must project or reach so as to effect adequate contact with and deflection by the confronting members 32. FIG. 7 illustrates a condition in which an adequate seal is effected even though the members 30, 32, because of warpage or other defect, cannot be brought completely together, while FIG. 10 shows a complete confrontation and consequent full deformation of the seal. These results are available to varying degrees regardless of the manner of applying internally expansive forces to the seal as described in detail above. As the seal is deformed, its wall 66 seals more tightly against the channel wall and thus prevents the entry of sand etc. into the channel.

A further advantage of the greater-than-180° extent of the channel 60 is that it may be easily formed, as by a spherical cutter or miller, one example of which is shown in FIG. 9 at 92. The significant feature here is that the cutter 92 may easily follow uphill and downhill contours and curves such as represented at 54–56 in FIG. 1, the achievement of which would be impossible with an undercut or dovetail channel as illustrated by the prior art. This advantage of the present invention adds to the flexibility, economy and overall superiority of the present seal structure over those heretofore known.

Figure 15:
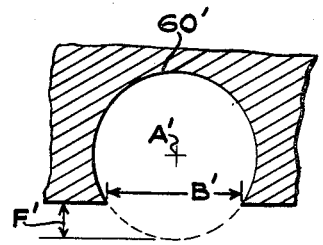
FIG. 15 is a section like FIG. 5 but showing a seal-receiving channel of optionally different dimensional characteristics.

FIG. 15 illustrates a modification of FIG. 5 in which the dimensions on the basis of a circle formed about A' are altered so that the chordal distance B' is less than that at B because the arcuate extent of the channel 60' is greater and thus the dimension F' is less than that at F. This cuts down somewhat on the reach or projection of the seal strip 58 but increases the retaining action of the channel 60' on the seal strip, which may be identical to that at 58, having the basic diameter E. Again, the internal force-applying characteristics may be any of those previously described or suggested.

Figure 17:
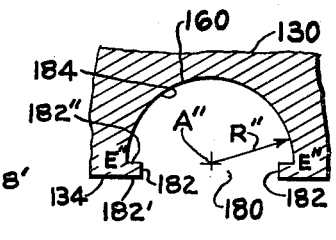
FIG. 17 is a cross section showing a modified form of channel for receiving the seal of FIG. 16.
Figure 18:
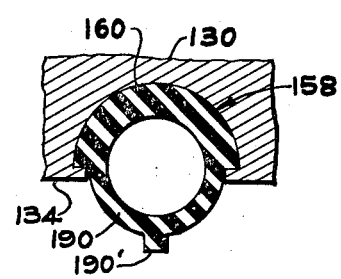
FIG. 18 is a section showing the seal installed in the channel.
Figure 19:
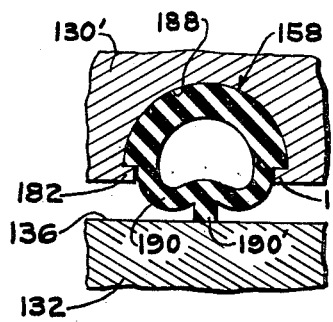
FIG. 19 is a similar section showing the seal partially deformed by the mating cooperative part.
Figure 20:
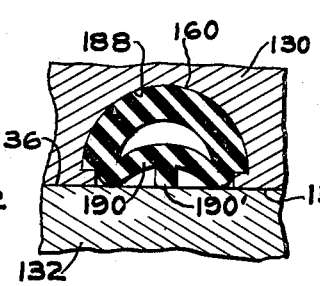
FIG. 20 shows the parts in contact and fully deforming the seal.

FIG. 17 shows another way of achieving mechanical retention of a seal 158 in a channel 160 by the process of supplementing a semicircle with overhanging lips. In this case, the channel 160 has a semicircular portion 184 formed about an axis A" and supplemented by lips or edges 182 that are spaced apart and parallel to define a slot 180 having a width less than diameter 2R". Here again is exploited the concept of a semicircular channel plus extensions effective to retain a seal strip, such as that shown at 158, so that cements, adhesives etc. need not be used. The lips or edges 182 are diametrically opposed on a diameter E"—E" that is parallel to and spaced inwardly from the surface 134 of the member 130, and each lip has an outer or lower surface 182' and an inner or upper surface 182".

Figure 22:
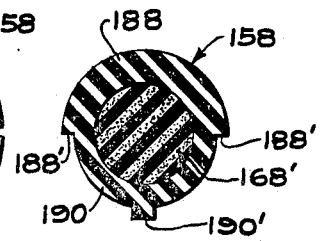
FIG. 22 shows the seal and core of FIG. 21, with the core expanded.
Figure 16:
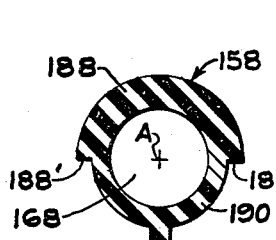
FIG. 16 is a cross section of a further form of seal.
Figure 21:
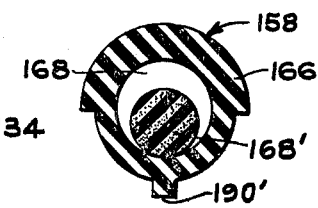
FIG. 21 is a section like FIG. 16 but illustrating a core in the manner of FIG. 12.

The steel strip 158, basically circular in cross section, has a semicircular portion 188 that fits the channel 160 and an integral projecting or reaching portion 190 of reduced section so as to provide diametrically opposed ledges 188' that fit under or are engaged by the lips 182, thus mechanically retaining the strip without the need for adhesives; and, again, the confronting surface 134 of the opposite member 132 does not have to be specially modified with the provision of complementary grooves or channels. As a further adjunct, the reduced portion 190 of the steel strip 158 may be provided with a radial rib 190' for contact with the confronting member 132, and the seal 158 may have a soft center achieved by simply a hollow interior as at 168, giving the seal an annular wall 166 like that previously described at 66, or the interior may be supplemented by a core element 168', the initial installation of which is shown in FIG. 21 and the ultimate condition of which is shown in FIG. 22. Also, the seal 158 may be used in any of the background environments described above and thus may be used in the installations of FIGS. 1–3 and may be implemented by the plugs and/or cores of FIGS. 2, 10, 11, 12, 13 and 14, besides equivalents thereof.

Because of the reduced section 190, the seal 158 has thereon the diametrically opposed ledges 188' that seal on or hook under the respective lips 182 and complete the retention of the seal in the channel 160. Since the hollow interior of the seal 158 is formed about the axis A', is follows that the wall thickness of the portion 190 is less than that of the wall thickness at 188 and therefore deflection of the seal by contact with the opposing member 132 results in such deformation of the seal that not only is more than adequate sealing relationship established between the members 130 and 132 but the seal itself is forced into more intimate contact with the wall of the channel 160 as is the case with the structure described above in connection with FIGS. 1–15. The channel 160 may be similarly formed by a spherical miller according to that shown in FIG. 9.

What is claimed is:

1. A core box structure and seal means therefor, comprising a pair of core box members respectively having confronting faces meeting at a parting plane, one of said members having therein an elongated channel of uniform substantially C-shaped cross section throughout its length and opening at said member face as an elongated slot of uniform width and having parallel edges, said channel having a wall including a portion of semi-cylindrical shape having a diameter greater than the width of the slot and formed about an axis spaced inwardly from and parallel to said member face and lying in a median plane perpendicular to said face and midway between the slot edges, said wall being continued beyond said semi-cylindrical portion at opposite sides of and toward said median plane as longitudinal lips overhanging the channel and respectively defining the edges of the slot, said lips projecting toward each other and each having an upper surface in said member face and an under surface on a diameter of said channel parallel to and inwardly of said member face, and an elongated preformed seal carried in the channel, said seal being of compressible material and having a channel-received portion of such cross section as to fill and be retained by the C-shaped channel, said seal being deformable at least in part into the channel as the member faces are compressed into meeting relationship at said parting plane.

2. The invention defined in claim 1, in which the channel-received portion of the seal is of semi-circular section fitting the semi-cylindrical wall and the integral seal portion that projects through the slot is of reduced section having diametrically opposed ledges fitting respectively under the under surfaces of the lips.

References Cited

UNITED STATES PATENTS

| | | | |
|---|---|---|---|
| 1,494,579 | 5/1924 | Bohn | 49—489 |
| 2,088,909 | 8/1937 | Jaubert | 49—477 X |
| 2,236,315 | 3/1941 | Gray | 49—489 X |

(Other references on following page)

UNITED STATES PATENTS

| | | | |
|---|---|---|---|
| 2,527,084 | 10/1950 | Smith | 49—477 X |
| 2,705,655 | 4/1955 | Brown et al. | 49—498 X |
| 2,734,239 | 2/1956 | Lombardi | 49—485 X |
| 2,760,791 | 8/1956 | Neubauer et al. | 49—477 X |
| 3,102,309 | 9/1963 | Peterson | 164—228 |
| 3,108,852 | 10/1963 | Olsen | 49—485 X |
| 3,124,852 | 3/1964 | Holderer | 49—477 |
| 3,266,102 | 8/1966 | Peterson | 164—228 |

REINALDO P. MACHADO, Primary Examiner

PHILIP C. KANNAN, Assistant Examiner

U.S. Cl. X.R.

49—47, 489; 277—34.3